United States Patent
Katal et al.

(10) Patent No.: US 12,051,788 B2
(45) Date of Patent: Jul. 30, 2024

(54) PROCESS FOR RECYCLING LITHIUM IRON PHOSPHATE BATTERIES

(71) Applicant: GREEN LI-ION PTE. LTD., Singapore (SG)

(72) Inventors: Reza Katal, Singapore (SG); Ebrahim Akhondi, Singapore (SG); Ying Shen Teo, Singapore (SG)

(73) Assignee: GREEN LI-ION PTE. LTD., Singapore (SG)

( * ) Notice: Subject to any disclaimer, the term of this patent is extended or adjusted under 35 U.S.C. 154(b) by 0 days.

(21) Appl. No.: 18/039,395

(22) PCT Filed: Jan. 17, 2022

(86) PCT No.: PCT/SG2022/050014
§ 371 (c)(1),
(2) Date: May 30, 2023

(87) PCT Pub. No.: WO2023/136773
PCT Pub. Date: Jul. 20, 2023

(65) Prior Publication Data
US 2024/0120565 A1    Apr. 11, 2024

(51) Int. Cl.
*H01M 10/00*    (2006.01)
*C01B 25/37*    (2006.01)
(Continued)

(52) U.S. Cl.
CPC ............ *H01M 10/54* (2013.01); *C01B 25/375* (2013.01); *C22B 3/42* (2013.01); *C22B 7/007* (2013.01);
(Continued)

(58) Field of Classification Search
CPC ..... H01M 10/54; H01M 10/0525; C22B 1/08; C22B 47/00; C22B 23/0484;
(Continued)

(56) References Cited

U.S. PATENT DOCUMENTS 3,690,844 A    9/1972 Flint et al.
3,852,044 A    12/1974 Neitzel et al.
(Continued)

FOREIGN PATENT DOCUMENTS

AU    2018276326 B2    7/2021
CA    3109084 A1 *    2/2020    ............. C01B 7/096
(Continued)

OTHER PUBLICATIONS

Press F et al, A Process for Recovering Metals From Recycled Rechargeable Batteries, Feb. 2020, See the Abstract. (Year: 2020).*
(Continued)

*Primary Examiner* — Cynthia H Kelly
*Assistant Examiner* — Monique M Wills
(74) *Attorney, Agent, or Firm* — Harness Dickey & Pierce P.L.C.

(57) ABSTRACT

The invention relates to a method of recycling lithium iron phosphate batteries with the aim of enabling the isolated recovery of elements from black mass. Black mass comprising at least cathodic and anodic components is immersed in a pH 13-14 solution to obtain a first leachate and first solid residue. The first leachate is immersed in a 4-6M acid solution to obtain a second leachate. The second leachate is passed through a first ion-exchange column where fluoride ions are retained and a second ion-exchange column where copper ions are to obtain a second eluate. The pH of the second eluate is adjusted to about 2.5-5 and a quantity of phosphoric acid that is sufficient to achieve an equivalent stoichiometric ratio of ferric iron and phosphate anions is added to obtain a first solution and an iron (III) phosphate precipitate. The first solution is combined with the first leachate to obtain a second solution. The pH of the second solution is adjusted to about 6.5 to a residual precipitate and a lithium solution.

9 Claims, 2 Drawing Sheets

(51) Int. Cl.
*C22B 3/42* (2006.01)
*C22B 7/00* (2006.01)
*H01M 10/54* (2006.01)

(52) U.S. Cl.
CPC .......... *C22B 7/008* (2013.01); *C01P 2002/72* (2013.01); *C01P 2006/40* (2013.01)

(58) Field of Classification Search
CPC ..... C22B 23/0415; C22B 9/023; C22B 7/096; Y02E 60/10
See application file for complete search history.

(56) References Cited

U.S. PATENT DOCUMENTS

| | | |
|---|---|---|
| 4,723,962 A | 2/1988 | Mehta |
| 5,160,631 A | 11/1992 | Frost et al. |
| 9,834,827 B2 | 12/2017 | Wang et al. |
| 10,522,884 B2 | 12/2019 | Wang et al. |
| 10,741,890 B2 | 8/2020 | Wang et al. |
| 11,127,992 B2 | 9/2021 | Wang et al. |
| 11,430,997 B2 | 8/2022 | Howe |
| 11,502,345 B2 | 11/2022 | Wang et al. |
| 11,508,999 B2 | 11/2022 | Morin et al. |
| 11,769,916 B2 | 9/2023 | Wang et al. |
| 11,827,998 B2 | 11/2023 | Wang et al. |
| 11,876,196 B2 | 1/2024 | Katal |
| 2007/0098609 A1 | 5/2007 | McConnell |
| 2012/0328494 A1 | 12/2012 | Dreisinger et al. |
| 2013/0302226 A1 | 11/2013 | Wang et al. |
| 2013/0312254 A1 | 11/2013 | Kim et al. |
| 2016/0115563 A1 | 4/2016 | Kotiranta et al. |
| 2017/0077564 A1 | 3/2017 | Wang et al. |
| 2018/0261894 A1 | 9/2018 | Wang et al. |
| 2019/0123402 A1 | 4/2019 | Wang et al. |
| 2021/0032721 A1 | 2/2021 | Hanisch et al. |
| 2021/0032724 A1 | 2/2021 | Maree et al. |
| 2021/0078013 A1 | 3/2021 | Kochhar et al. |
| 2021/0123119 A1 | 4/2021 | Oosterhof et al. |
| 2021/0324495 A1 | 10/2021 | Rohde et al. |
| 2021/0344058 A1 | 11/2021 | Liu et al. |
| 2021/0372001 A1 | 12/2021 | Wang et al. |
| 2021/0384563 A1 | 12/2021 | Gratz et al. |
| 2021/0391606 A1 | 12/2021 | Wang et al. |
| 2022/0017991 A1 | 1/2022 | Lee et al. |
| 2022/0131204 A1 | 4/2022 | Wang et al. |
| 2022/0166079 A1 | 5/2022 | Liu et al. |
| 2022/0205064 A1 | 6/2022 | Szolga, Jr. et al. |
| 2022/0285750 A1 | 9/2022 | Li et al. |
| 2022/0311068 A1 | 9/2022 | Wang et al. |
| 2022/0325378 A1 | 10/2022 | Wang et al. |
| 2022/0416325 A1 | 12/2022 | Gratz et al. |
| 2023/0038978 A1 | 2/2023 | Gratz et al. |
| 2023/0044374 A1 | 2/2023 | Wang et al. |
| 2023/0059571 A1 | 2/2023 | Arsenault et al. |
| 2023/0147371 A1 | 5/2023 | Wang et al. |
| 2023/0198040 A1 | 6/2023 | Wang et al. |
| 2023/0304128 A1 | 9/2023 | Akhondi et al. |
| 2023/0332272 A1 | 10/2023 | Katal et al. |

FOREIGN PATENT DOCUMENTS

| | | |
|---|---|---|
| CN | 101450815 A | 6/2009 |
| CN | 101847663 A | 9/2010 |
| CN | 102157726 A | 8/2011 |
| CN | 102892708 A | 1/2013 |
| CN | 104953200 A | 9/2015 |
| CN | 103280610 B | 11/2015 |
| CN | 106505225 A | 3/2017 |
| CN | 107653378 A | 2/2018 |
| CN | 107871912 A | 4/2018 |
| CN | 109075407 A | 12/2018 |
| CN | 110527836 A | 12/2019 |
| CN | 111003736 A | 4/2020 |
| CN | 111304441 A | 6/2020 |
| CN | 111675203 A | 9/2020 |
| CN | 112126783 A | 12/2020 |
| CN | 112441572 A | 3/2021 |
| CN | 113073194 A | 7/2021 |
| EP | 2532759 A1 | 12/2012 |
| EP | 2450991 B1 | 7/2013 |
| EP | 3381080 A1 | 10/2018 |
| GB | 2611158 A | 3/2023 |
| JP | 2011184764 A | 9/2011 |
| JP | 5161361 B1 | 3/2013 |
| JP | 2014156648 A | 8/2014 |
| JP | 2016003382 A | 1/2016 |
| KR | 20190009771 A | 1/2019 |
| RU | 2604082 C2 | 12/2016 |
| TW | 202105823 A | 2/2021 |
| TW | 202107764 A | 2/2021 |
| TW | 202111131 A | 3/2021 |
| WO | WO-2012026061 A1 | 3/2012 |
| WO | WO-2013160754 A1 | 10/2013 |
| WO | WO-2017091562 A1 | 6/2017 |
| WO | WO-2018209164 A1 | 11/2018 |
| WO | WO-2018223193 A1 | 12/2018 |
| WO | WO-2019149698 A1 | 8/2019 |
| WO | WO-2019150403 A1 | 8/2019 |
| WO | WO-2020109045 A1 | 6/2020 |
| WO | WO-2020124130 A1 | 6/2020 |
| WO | WO-2020220559 A1 | 11/2020 |
| WO | 2021161316 A1 | 8/2021 |
| WO | WO-2021177537 A1 | 9/2021 |
| WO | WO-21252433 A1 | 12/2021 |
| WO | WO-2021242831 A2 | 12/2021 |
| WO | WO-21252433 A9 | 1/2022 |
| WO | WO-2022045973 A1 | 3/2022 |
| WO | WO-2022062675 A1 | 3/2022 |
| WO | WO-2022127117 A1 | 6/2022 |
| WO | WO-2022219221 A1 | 10/2022 |
| WO | WO-2022219222 A1 | 10/2022 |
| WO | WO-2022219223 A1 | 10/2022 |
| WO | WO-2022221285 A1 | 10/2022 |
| WO | WO-202272162 A1 | 12/2022 |
| WO | WO-2023010969 A1 | 2/2023 |
| WO | WO-2023015171 A1 | 2/2023 |
| WO | WO-2023024599 A1 | 3/2023 |
| WO | WO-2023034556 A1 | 3/2023 |
| WO | WO-2023036726 A1 | 3/2023 |
| WO | WO-2023136773 A1 | 7/2023 |
| WO | WO-2023163658 A2 | 8/2023 |

OTHER PUBLICATIONS

Larouche, F. et al. (2020). Progress and Status of Hydrometallurgical and Direct Recycling of Li-Ion Batteries and Beyond. Materials 13:801.
Forte, F. et al. (2020). Lithium iron phosphate batteries recycling: An assessment of current status. Critical Reviews in Environmental Science and Technology, 1064:3389.
Yan et al. (2020). High-efficiency method for recycling lithium from spent $LiFePO_4$ cathode. Nanotechnology Reviews, 9: 1586-1593.
Tasaki K. et al. (2003). Decomposition of $LiPF_6$ and Stability of $PF_5$ in Li-Ion Battery Electrolytes: Density Functional Theory and Molecular Dynamics Studies. Journal of the Electrochemical Society 150.12, A1628.
International Search Report and Written Opinion from corresponding PCT Application No. PCT/SG2022/050014 dated Mar. 28, 2022.
Xu, J., et al., "A review of the processes and technologies for the recycling of lithium-ion secondary batteries," Journal of Power Sources, 177: 512-527 (2008).
Freitas, M.B.J.G. & Garcia, E.M., "Electrochemical recycling of cobalt from cathodes of spent lithium-ion batteries," Journal of Power Sources, 171: 953-959 (2007).
Castillo, S., et al., "Advances in the recovering of spent lithium battery compounds," Journal of Power Sources, 112: 247-254 (2002).
Contestabile, M., et al., "A laboratory-scale lithium battery recycling process," Journal of Power Sources, 83: 75-78 (1999).

(56) References Cited

OTHER PUBLICATIONS

Zou, H., et al., "A novel method to recycle mixed cathode materials for lithium ion batteries," Green Chem, 15: 1183-1191 (2013).

Gratz, E., et al., "A closed loop process for recycling spent lithium ion batteries," Journal of Power Sources, 262: 255-262 (2014).

Wang, H., et al., "Hydrometallurigcal processing of Li-Ion battery scrap from electric vehicles," European Metallurgical Conference, 2011, p. 1-26.

Bing Han, Rana Anwar Ul Haq, Marjatta Louhi-Kultanen, Lithium carbonate precipitation by homogeneous and heterogeneous reactive crystallization, 2020, Hydrometallurgy, vol. 195, (Year: 2020).

O. Sitando, P.L. Crouse, Processing of a Zimbabwean petalite to obtain lithium carbonate, 2012, International Journal of Mineral Processing, vols. 102-103 (Year: 2012).

Ulusoy Erol HB, Hestekin CN, Hestekin JA. Effects of Resin Chemistries on the Selective Removal of Industrially Relevant Metal ions Using Wafer-Enhanced Electrodeionization. 2021. Membranes. 11 (1):45. https://doi.org/10.3390/membranes11010045 (Year:2021).

Gao et al. Lithium Carbonate Recovery from Cathode Scrap of Spent Lithium-Ion Battery a Closed-Loop Process, Jan. 12, 2017, Environmental Science & Technology 51 (3), 1662-1669, (Year: 2017).

Chao Peng, Fupeng Liu, Zulin Wang, Benjamin P. Wilson, Mari Lundstrom, Selective extraction of lithium (Li) and preparation of battery grade lithium carbonate (Li2C03) from spent Li-ion batteries in nitrate system, Journal of Power Sources, vol. 415, 2019, pp. 179-188 (Year: 2019).

Ahwadmin, What is Deionized Water, and What is it Used for?, Oct. 21, 2021, American Home Water & Air (Year: 2021).

Sina Shakibania, Alireza Mahmoudi, Mohammad Mokmeli, Fereshteh Rashchi, The effect of the chloride ion on chemical degradation of LIX 984N extractant, 2020, Minerals Engineering (Year: 2020).

Ooi et al., (2017), "Recovery of lithium from salt-brine eluates by direct crystallization as lithium sulfate", Hydrometallurgy, 174, 123-130.

Rosales et al., (2014), "Novel process for the extraction of lithium from ?-spodumene by leaching with HF", Hydrometallurgy, 147-148.

Search Report from European Application No. 22893999.7 dated Mar. 11, 2024.

* cited by examiner

PROCESS FOR RECYCLING LITHIUM IRON PHOSPHATE BATTERIES

CROSS-REFERENCE TO RELATED APPLICATIONS

This patent application is a U.S. national phase application under 35 U.S.C. § 371 of International Patent Application No. PCT/SG2022/050014, which has an international filing date of 17 Jan. 2022. The contents of the application recited above are incorporated herein by reference in their entirety.

FIELD OF INVENTION

The present invention generally relates to a method for recycling spent lithium-ion batteries. More particularly, it relates to a method for recycling spent lithium iron phosphate batteries.

BACKGROUND

Lithium-ion batteries contain valuable materials which would go to waste when the batteries are spent and discarded. With the rising use of lithium-ion batteries, the recovery of valuable materials from spent lithium-ion batteries have become an important industry. In particular, lithium iron phosphate ("LFP") batteries are becoming a common type of lithium-ion batteries. The consumption of LFP batteries is increasing sharply in electric vehicles and power grids in preference to other types of lithium-ion batteries because they tend to be cheaper, safer and last longer. Therefore, the LFP presence in lithium-ion batteries' waste streams cannot be simply ignored, even though most processes focus solely on the recovery of nickel, cobalt and manganese.

Post-consumption of lithium-ion batteries, especially LFP batteries could alleviate the life cycle impact of electric vehicles by almost 50% [1]. The global warming potential associated with the production of every kg of LFP active material calculated using life cycle analysis hovers around 19 to 55 MJ. Therefore, recycling all lithium-ion batteries, not just the ones rich in nickel, cobalt and manganese will be a great opportunity for boosting the local economies as long circular economy principles are in place.

Conventionally, spent LFP batteries are first dismantled to separate out their cathodes. The cathodes are then crushed or shredded for recycling. The rest of the spent LFP batteries, for example, the anodes, are discarded as waste. Separating different parts of the batteries is very labour intensive and time consuming. Therefore, conventional recycling methods are not able to adequately handle the recycling of battery parts of LFP batteries, specifically from black mass which is obtained by shredding spent batteries and comprises both cathodes and anodes without first undergoing further pre-processing prior to recycling.

Present efforts of recycling LFP batteries tend to focus on the recovery of lithium to the detriment of other less expensive but nonetheless usable materials like iron and iron phosphate. CN107240731B, describes methods of obtaining lithium from LFP batteries in the form of lithium carbonate through chemical processes, without referring to obtaining iron or iron phosphate. Consequently, significant quantities of such materials are allowed to be discarded as waste instead of being recovered.

LFP black mass contains many types of impurities that could adversely affect the purity of valuable materials recovered from recycling. This black mass needs to undergo further processing including chemical separation to remove impurities such as fluoride, aluminium, and copper. Conventional processes for recycling black mass obtained from other types of batteries typically remove aluminium by changing pH levels which is similar process for LFP results in iron being removed together with the aluminium. Conventional processes typically remove copper by cementation or by precipitation through addition of sodium hydroxide but utilizing this process for LFP black mass results in other elements such as iron phosphate being removed with the copper. These methods of removing such impurities do not allow for any isolated recovery of such elements as they are removed together with other elements.

Aluminium plays a pivotal role as a cathodic current collector in lithium-ion batteries and LFP batteries are no exception. Failure to separate aluminium current conductor from the active material could decrease the capacity of regenerated cathodes by almost 40 percent if aluminium's molar ratio to the active material exceeds 3 percent. Additionally, in known LFP processes, removal of impurities is a necessary step to isolate and recover valuable materials (e.g., lithium) for reuse, but results in other usable materials being merely discarded as waste [2, 3].

Further, conventional LFP battery recycling processes do not properly address removal of fluorine. Tasaki, Ken, et al. [4] illustrates this by describing the dangers of the presence of hydrogen fluoride as a result of lithium hexafluorophosphate, which is present in most lithium-ion batteries, in electrolyte solutions reacting with small amounts of water or alcohols, without offering any solutions. Fluorine compounds are corrosive and could damage recycling equipment, have a negative impact on the purity of elements that may be subsequently extracted, and have a damaging effect on battery performance.

Thus, there exists a need for an LFP battery recycling process which reduces the loss of valuable materials and a need to better handle the removal of impurities.

The invention seeks to answer these needs. Further, other desirable features and characteristics will become apparent from the rest of the description read in conjunction with the accompanying drawings.

SUMMARY OF INVENTION

In one aspect of the invention, there is provided a method of recycling black mass obtained from lithium iron phosphate batteries, comprising an alkaline leaching step, comprising adding an alkaline solution with a pH of 13-14 to the black mass to obtain a first leachate and a first solid residue, an acid leaching step, comprising adding a 4M-6M acid solution to the first solid residue for a first duration to obtain a second leachate, passing the second leachate through a first ion-exchange column wherein fluoride ions from the second leachate are retained in the first resin column to obtain a first eluate, passing the first eluate through a second ion-exchange column wherein copper ions from the first eluate are retained in the second resin column to obtain a second eluate, an iron precipitation step, comprising raising the pH of the second eluate to 2.5-5 and adding a quantity of phosphoric acid to the second eluate, to obtain a first solution and an iron (III) phosphate precipitate, combining the first leachate and the first solution to obtain a second solution and adjusting the pH of the second solution to about 6.5 to obtain a residual precipitate and a lithium solution, wherein the quantity of phosphoric acid is sufficient to achieve an equivalent stoichiometric ratio of ferric iron and phosphate anions in the second eluate.

Optionally, the acid solution is selected from a group consisting of sulphuric acid and hydrochloric acid. Optionally, the acid leaching step further comprises diluting the acid solution by about ½ and adding a first oxidising agent to the acid solution for a second duration to obtain the second leachate. Optionally, the first and second duration are each about 30-60 minutes and run consecutively. Optionally, the iron precipitation step further comprises adding a second oxidising agent to the second eluate.

Optionally the first and/or second oxidising agent are selected from a group consisting of hydrogen peroxide, ozone, oxygen, chlorine and potassium permanganate. Optionally, the first and/or second oxidising agent added is hydrogen peroxide and about 500 ml per kg of the black mass. Optionally, the iron (III) phosphate precipitate has a purity of >99.5%. Optionally, the residual precipitate comprises mainly aluminium hydroxide, copper (II) hydroxide, calcium fluoride and iron (III) hydroxide.

DETAILED DESCRIPTION

In the following detailed description, reference is made to the accompanying drawings which form a part hereof. The processes and systems described in the detailed description and drawings are for illustrative purposes and are not meant to be limiting. Other embodiments can be utilised, and other changes can be made, without departing from the scope of the disclosure presented herein. In the present disclosure, depiction of a given element or consideration or use of a particular element number in a particular Fig. or a reference thereto in corresponding descriptive material can encompass the same, an equivalent, or an analogous element or element number identified in another Fig. or descriptive material associated therewith.

Black mass is prepared by crushing/shredding at least the cathodic and anodic LFP battery materials all together. The black mass may collectively include all the key elements of spent LFP batteries, including both anodic and cathodic materials.

Figure 1:
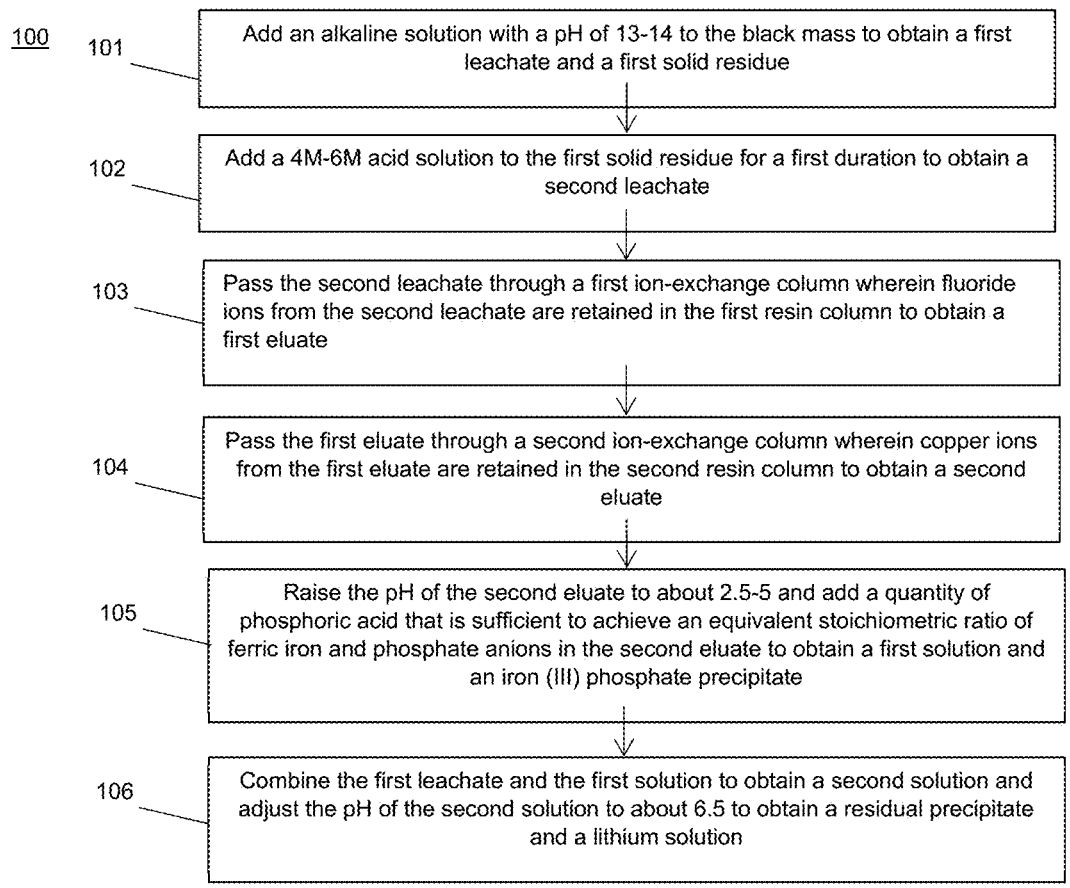
FIG. 1 is a block diagram depicting a lithium iron phosphate recycling process according to a primary embodiment of the present invention.

Referring to FIG. 1, a block diagram 100 depicting a lithium iron phosphate recycling process according to a primary embodiment of the present invention is depicted. The black mass obtained earlier is subjected to an alkaline leaching step. An alkaline solution of pH 13-14 is added to the black mass to obtain a first leachate and a first solid residue to leach aluminium present in the black mass into the first leachate 101. In a non-limiting example, the alkaline solution is a 10% sodium hydroxide solution. While a strong alkali i.e., one that fully ionises in water, is preferred, it would be readily apparent to a skilled person that any alkali can be used so long as the resultant pH is 13-14 and the alkali does not introduce unwanted contaminants such as aluminium hydroxide. Examples of suitable alkali include sodium hydroxide, lithium hydroxide, and potassium hydroxide.

The amount of alkaline solution used should be proportionate to the quantity of black mass used and of a volume that is at least sufficient to allow full immersion of the black mass in the alkaline solution. By way of example, 18-25 l of sodium hydroxide solution for every 1 kg of black mass may be used. Preferably, 20 l of sodium hydroxide solution for every 1 kg of black mass is used. Preferably, a reaction temperature of 60-80° C. is attained. Preferably the reaction time is 30-60 minutes. Preferably, mechanical agitation is provided throughout the reaction time to ensure high levels of aluminium enter solution and homogeneity of the first leachate.

The first solid residue is subjected to an acid leaching step. 4M-6M of an acid solution is added to the first solid residue for a first duration to obtain a second leachate 102. Preferably, and at the end of the first duration, the acid solution is diluted by about % and an oxidising agent is added to the acid solution for a second duration to obtain the second leachate. Preferably the oxidising agent is selected from a group consisting of hydrogen peroxide, ozone, oxygen, chlorine and potassium permanganate. More preferably the oxidising agent is hydrogen peroxide. As a very low pH is desired, the acid solution is preferably a strong acid i.e., one that that fully dissociates into its ions in an aqueous solution. In a non-limiting example, the acid solution is a sulphuric acid solution. It would be readily apparent to a skilled person that any acid solution can be used so long as the acid solution does not introduce unwanted contaminants. The amount of acid solution used should be proportionate to the quantity of the black mass used and of a volume that is at least sufficient to allow full immersion of the first residue in the acid solution. Approximately 95% of the iron and copper and 70% of lithium are expected to enter the second leachate.

The first and second duration are preferably each about 30-60 minutes and run consecutively. Preferably, a reaction temperature of 60-80° C. is maintained throughout the first and second duration. Preferably, mechanical agitation is provided throughout the first and second duration.

By way of example, 8-10 l of sulphuric acid is added to the first solid residue for every 1 kg of starting quantity of black mass used for a first duration. At the end of the first duration, 8-10 l of deionised water is added to dilute the acid solution by about ½ with a first oxidising agent being concurrently added for a second duration, the first and second duration being each about 30-60 minutes. The first oxidising agent is preferably selected from a group consisting of hydrogen peroxide, ozone, oxygen, chlorine and potassium permanganate. The first oxidising agent is more preferably hydrogen peroxide and added in quantity of 400-600 ml per kg of black mass but most preferably 500 ml per kg of black mass.

At the end of the second duration, the second leachate may optionally be put through a press filter to separate graphite residue from the second leachate. The filter membrane may be made of polypropylene, cellulose acetate, polyvinylidene fluoride. The filter membrane should preferably have pore size of 2-15 micron. A skilled person will readily appreciate that other filter membrane materials may be employed so long as it does not degrade when subject to the temperature and pH of the second leachate and is of the appropriate pore size. In this manner, the second leachate passes through the membrane whilst the graphite residue is retained by the filter.

While a significant quantity of approximately 28% of the fluoride ions are expected to enter the first leachate during the alkaline leaching stage, sufficiently undesirable amounts which may damage recycling equipment, have a negative impact on the purity of subsequent extracted elements, and have a negative effect on subsequent battery performance will remain as fluoride ions in the second leachate and will need to be removed. To this end, the second leachate is passed through a first ion exchange column where fluoride ions from the second leachate are retained in the first ion exchange column to obtain a first eluate 103.

In a preferred embodiment of the invention, the first ion exchange column is a fixed bed column comprising a fluoride selective ion exchange resin, the resin being a chelating resin loaded with aluminium ions and comprises a polymer structure of gel polystyrene crosslinked with divinylbenzene and sulfonic acid functional group. It will be readily understood by a skilled person that any ion exchange column that is highly selective for fluoride ions in acidic conditions may be employed in this manner.

The second leachate is cooled to a temperature of approximately 30-40° C. before being passed through the first ion exchange column with a retention time of about 10-40 minutes depending on the specific properties of the chelating resin. As the second leachate is passed through the first ion exchange column, fluoride ions present in the second leachate come into contact with the functional group of the chelating resin resulting in an exchange of chloride for fluoride, with the fluoride being retained in the first ion exchange column while the first eluate is passed out of the first ion exchange column with only trace amounts of fluoride ions present in the first eluate. The first ion exchange column can be regenerated by running an aluminium solution, for example an aluminium chloride solution of ≤35 g/l concentration. In this manner, fluoride ions retained in the first ion exchange column and be subsequently eluted out and recovered for subsequent reuse.

The first eluate is then passed through a second ion exchange column where copper ions present in the first eluate are retained in the first resin column to obtain a first eluate 104. In a preferred embodiment of the invention, the second ion exchange column is a fixed bed column comprising a cationic exchange resin. The cationic exchange resin preferably comprises a copolymer of styrene-divinylbenzene, gel matrix, and bis-picolylamine functional group. The functional group of the cationic exchange resin may optionally be polyethyleneimine, aminomethylphosphonic acid, iminodiacetic acid, carboxylic acid, or any other suitable functional group with a high affinity for copper ions. The gel matrix may optionally be epoxy, modified epoxy, polyester, or other suitable matrix systems. An example of a suitable cationic exchange resin is Dupont AMBERSEP™ M4195. It will be readily understood by a skilled person that any ion exchange column that is highly selective for copper in acidic conditions may be employed in this manner.

The first eluate is passed through the second ion exchange column with a retention time of approximately 10-40 min, depending on the resin characteristics. Stoichiometric and efficient removal is possible due to higher $Cu^{2+}$ affinity than $X^+$ for cation exchange sites, i.e., the copper-X separation constant is greater than 1 ($\alpha_{Cu/X}(>1)$) (where X is a random cationic resin). The copper ions are thus selectively retained in the second ion exchange column while a second eluate is passed out. The copper ions may be recovered and reused. The cationic exchange resin used for copper extraction can be regenerated and reused for subsequent cycles of copper extraction. Resin regeneration is done by using a 4M-6M sulfuric acid (HCl or nitric acid can be used instead). Acidic solution passes through the resin column from top to bottom or vice versa to remove the copper ions from the resin.

The second eluate is subjected to further processing where an iron (III) phosphate precipitate is obtained from the second eluate. The pH of the first eluate is also raised to about 2.5-5 to allow iron (III) phosphate to precipitate to obtain a first solution 105. The pH may be raised by adding an alkali such as sodium hydroxide till the desired pH of about 2.5-5 is obtained. It will be readily understood by a skilled person that any alkali can be added so long as it does not introduce contaminants. A quantity of phosphoric acid is subsequently added to the first solution until equivalent stoichiometric ratios of ferric iron and phosphate anions in the solution are achieved. The amount of ferric ions in the first solution and accordingly, the amount of phosphoric acid to add since the ratio will be skewed toward ferric ions can be derived from the expected quantity of ferric iron present in the starting quantity of black mass used. The iron (III) phosphate can then be separated from the first solution by physical means such as a press filter. In a preferred embodiment a second oxidising agent is also added to the second eluate to facilitate the oxidation of ferrous ions present in the first solution to ferric ions. The second oxidising agent is preferably selected from a group consisting of hydrogen peroxide, ozone, oxygen, chlorine and potassium permanganate. The second oxidising agent is more preferably hydrogen peroxide and added in quantity of 400-600 ml per kg of black mass but most preferably 500 ml per kg of black mass.

Figure 2:
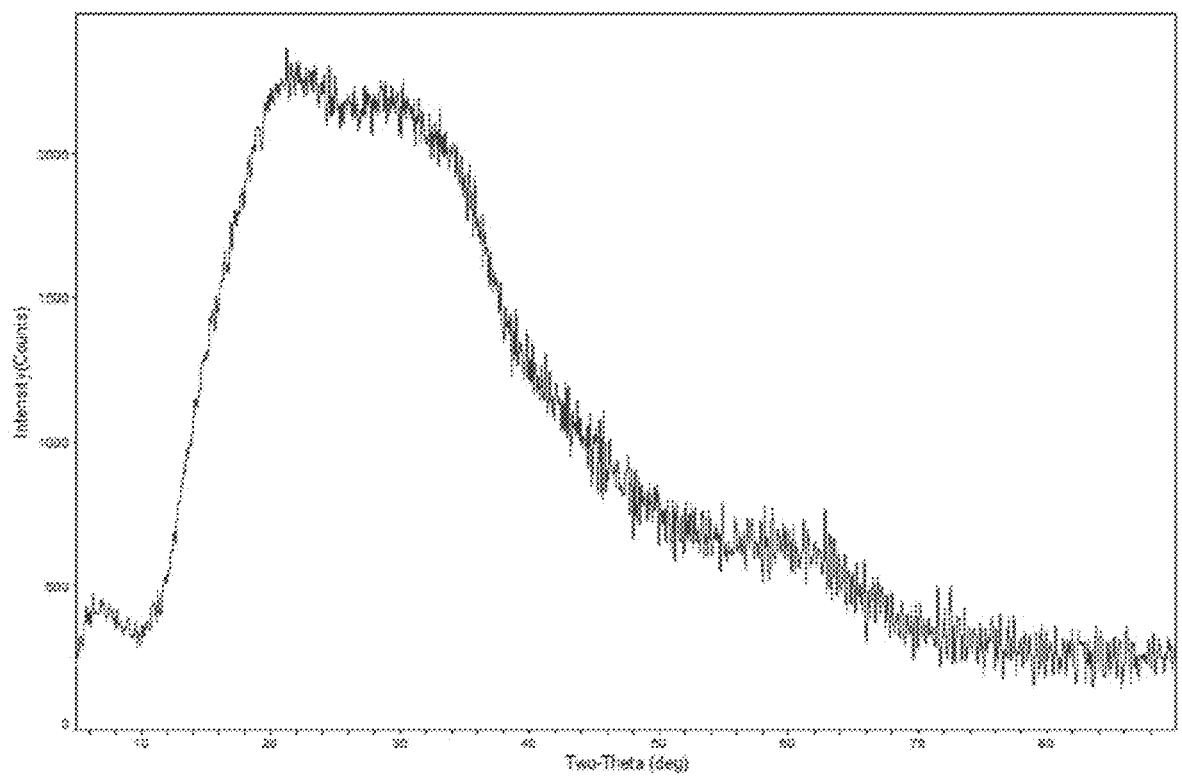
FIG. 2 depicts an XRD analysis graph of the precipitate obtained from a first solution.

Referring to FIG. 2, the peak in the graph shows a high concentration of iron (III) phosphate without other obvious peak in the graph indicating high purity of the iron (III) phosphate. Subsequent analysis by inductively coupled plasma—optical emission spectrometry (results not shown) revealed a purity of at least 99.5% purity of the iron (III) phosphate product obtained from the precipitate.

The first solution which now contains mainly sodium and lithium cations is subsequently combined with the first leachate obtained during the alkaline leaching step as described earlier to obtain a second solution. The pH of the second solution is then adjusted to about 6.5 by adding an alkaline or acidic solution as required to obtain a residual. Since the pH of the first leachate is alkaline while the pH of the first solution is acidic, the resultant second may have a pH that is higher or lower than about 6.5. By way of example, the pH can be lowered to about 6.5 by adding sulphuric acid or can be raised by adding sodium hydroxide, potassium hydroxide or lithium hydroxide. Alternatively, the pH of the second solution may also be raised by adding deionised water. It will be readily understood by the skilled addressee that any acid or alkali can be used to adjust the pH of the second solution so long as it does not introduce contaminants for example aluminium hydroxide.

Optionally, lime also known as calcium hydroxide can also be added to the second solution to remove any fluoride ions present by way of precipitation as calcium fluoride that may be present in the first leachate. The amount of calcium hydroxide added to the second solution should be proportionate to the amount of fluoride present and is preferably about 1% w/v. The pH adjustment will allow the precipitation of a residual precipitate to be obtained along with a lithium solution 106. Preferably the residual precipitate comprises mainly aluminium hydroxide, copper (II) hydroxide, calcium fluoride and iron (III) hydroxide. Preferably the precipitation occurs over a duration of about 1 hour. Preferably a temperature of about 50-60° C. is maintained throughout the precipitation. Preferably the second solution is subject to mechanical agitation during precipitation. The residual precipitate can then be physically separated by way of a press filter to obtain a lithium solution that is largely free of contaminants and can be subjected to further processing to recover the lithium present.

Table 1 depicts the concentrations (g/l) of the elements of interest present in the respective solutions obtained throughout the process.

TABLE 1

Concentration of different elements in solution (g/l)

|    | First leachate | Second leachate | First eluate | Second eluate | First solution |
|----|----------------|-----------------|--------------|---------------|----------------|
| Fe | 0              | 11.6            | 11.6         | 11.6          | 0              |
| Al | 1.2            | 0               | 0            | 0             | 0              |
| F  | 0.7            | 0.3             | 0            | 0             | 0              |
| Cu | 0              | 0.11            | 0.11         | 0             | 0              |
| P  | 5              | 1.5             | 1.5          | 1.5           | 0              |

REFERENCES

[1] Larouche, F., Tedjar, F., Amouzegar, K., Houlachi, G., Bouchard, P., Demopoulos, G. P., Zaghib, K., 2020. Progress and Status of Hydrometallurgical and Direct Recycling of Li-Ion Batteries and Beyond. Materials 13, 801. https://doi.org/10.3390/ma13030801
[2] Federica Forte, Massimiliana Pietrantonio, Stefano Pucciarmati, Massimo Puzone & Danilo Fontana (2020): Lithium iron phosphate batteries recycling: An assessment of current status, Critical Reviews in Environmental Science and Technology, DOI: 10.1080/10643389.2020.1776053.
[3] Tingting Yan, Shengwen Zhong, Miaomiao Zhou, Xiaoming Guo, Jingwei Hu, Fangfang Wang, Fantao Zeng, and Sicheng Zuo: High-efficiency method for recycling lithium from spent $LiFePO_4$ cathode. Nanotechnology Reviews 2020; 9: 1586-1593.
[4] Decomposition of $LiPF_6$ and Stability of PF 5 in Li-Ion Battery Electrolytes: Density Functional Theory and Molecular Dynamics Studies." Journal of the Electrochemical Society 150.12 (2003): A1628. DOI: 10.1149/1.1622406

The invention claimed is:

1. A method of recycling black mass obtained from lithium iron phosphate batteries, comprising:
   an alkaline leaching step, comprising adding an alkaline solution with a pH of 13-14 to the black mass to obtain a first leachate and a first solid residue;
   an acid leaching step, comprising adding a 4M-6M acid solution to the first solid residue for a first duration to obtain a second leachate;
   passing the second leachate through a first ion-exchange column wherein fluoride ions from the second leachate are retained in the first ion-exchange column to obtain a first eluate;
   passing the first eluate through a second ion-exchange column wherein copper ions from the first eluate are retained in the second ion-exchange column to obtain a second eluate;
   an iron precipitation step, comprising raising the pH of the second eluate to 2.5-5 and adding a quantity of phosphoric acid to the second eluate, to obtain a first solution and an iron (III) phosphate precipitate;
   combining the first leachate and the first solution to obtain a second solution; and
   adjusting the pH of the second solution to about 6.5 to obtain a residual precipitate and a lithium solution;
   wherein, the quantity of phosphoric acid is sufficient to achieve an equivalent stoichiometric ratio of ferric iron and phosphate anions in the second eluate.

2. The method according to claim 1, wherein the acid solution is selected from a group consisting of sulphuric acid and hydrochloric acid.

3. The method according to claim 1, wherein the acid leaching step further comprises diluting the acid solution by about ½ and adding a first oxidising agent to the acid solution for a second duration to obtain the second leachate.

4. The method according to claim 1, wherein the iron precipitation step further comprises adding a second oxidising agent to the second eluate.

5. The method according to claim 3, wherein the first and second duration are each about 30-60 minutes and run consecutively.

6. The method according to claim 3, wherein the first and/or second oxidising agent are selected from a group consisting of hydrogen peroxide, ozone, oxygen, chlorine and potassium permanganate.

7. The method according to claim 6, wherein the first and/or second oxidising agent added is hydrogen peroxide and about 500 ml per kg of the black mass.

8. The method according to claim 1, wherein the iron (III) phosphate precipitate has a purity of >99.5%.

9. The method according to claim 1, wherein the residual precipitate comprises aluminium hydroxide, copper (II) hydroxide, calcium fluoride and iron (III) hydroxide.

* * * * *